(12) United States Patent
Gardner et al.

(10) Patent No.: US 11,433,654 B2
(45) Date of Patent: Sep. 6, 2022

(54) FLUID-FILLED PRESSURE SENSOR ASSEMBLY CAPABLE OF HIGHER PRESSURE ENVIRONMENTS

(71) Applicant: Kulite Semiconductor Products, Inc., Leonia, NJ (US)

(72) Inventors: Robert Gardner, Westwood, NJ (US); Louis DeRosa, Wayne, NJ (US); Richard Martin, Leonia, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 161 days.

(21) Appl. No.: 14/533,662

(22) Filed: Nov. 5, 2014

(65) Prior Publication Data
US 2016/0123826 A1 May 5, 2016

(51) Int. Cl.
| | | |
|---|---|---|
| *G01L 19/06* | (2006.01) | |
| *G01L 19/00* | (2006.01) | |
| *B32B 37/00* | (2006.01) | |
| *B32B 37/18* | (2006.01) | |
| *G01L 9/00* | (2006.01) | |
| *G01L 13/00* | (2006.01) | |

(52) U.S. Cl.
CPC .......... *B32B 37/0076* (2013.01); *B32B 37/18* (2013.01); *G01L 9/0052* (2013.01); *G01L 13/00* (2013.01); *G01L 19/0046* (2013.01); *B32B 2457/00* (2013.01)

(58) Field of Classification Search
CPC .................. G01L 19/0618; G01L 19/0672
See application file for complete search history.

(56) References Cited

U.S. PATENT DOCUMENTS

| | | | | |
|---|---|---|---|---|
| 4,163,395 A | * | 8/1979 | Medlar ................. | G01L 9/0054 73/708 |
| 4,934,193 A | * | 6/1990 | Hayata ................. | G01L 9/0052 338/4 |
| 5,621,176 A | * | 4/1997 | Nagano ................. | G01L 19/143 73/714 |

(Continued)

FOREIGN PATENT DOCUMENTS

WO     WO-02066948 A1 * 8/2002 ........... G01L 19/003

*Primary Examiner* — Manish S Shah
*Assistant Examiner* — Ruben C Parco, Jr.
(74) *Attorney, Agent, or Firm* — Troutman Pepper Hamilton Sanders LLP; James E. Schutz; Christopher C. Close, Jr.

(57) ABSTRACT

This disclosure provides systems and methods for a fluid-filled pressure sensor assembly for higher pressure environments. A fluid-filled pressure sensor assembly may be adapted for coupling to a structure at a mating surface and may include a header; a pressure sensor coupled to the header; a diaphragm coupled to the header and configured for positioning forward of the mating surface so that a fluid region is disposed between the diaphragm and the pressure sensor; a fill hole coupled to the fluid region; a sealing element coupled to the fill hole and configured for positioning forward of the mating surface; and wherein during operation the first pressure applied at the diaphragm is substantially transferred by the fluid in the fluid region and the fill hole to an inner-side of the sealing element and the first pressure is about equivalent to a second pressure applied at an outer-side of the sealing element.

16 Claims, 3 Drawing Sheets

(56) References Cited

U.S. PATENT DOCUMENTS

| | | | | |
|---|---|---|---|---|
| 5,994,161 A * | 11/1999 | Bitko | ............... | B81B 7/0012 |
| | | | | 438/50 |
| 6,076,409 A * | 6/2000 | Bang | ............... | G01L 19/0038 |
| | | | | 73/756 |
| 6,311,561 B1 * | 11/2001 | Bang | ............... | G01L 9/0073 |
| | | | | 73/708 |
| 7,377,176 B1 * | 5/2008 | Broden | ............... | G01L 19/0007 |
| | | | | 73/753 |
| 8,371,176 B2 * | 2/2013 | Rozgo | ............... | G01L 19/0007 |
| | | | | 73/727 |
| 2010/0064816 A1 * | 3/2010 | Filippi | ............... | G01L 19/0645 |
| | | | | 73/715 |

* cited by examiner

FIG. 1 – PRIOR ART

FLUID-FILLED PRESSURE SENSOR ASSEMBLY CAPABLE OF HIGHER PRESSURE ENVIRONMENTS

TECHNICAL FIELD

This disclosure generally relates to pressure sensors and more particularly to a fluid-filled pressure sensor assembly capable of higher pressure environments.

BACKGROUND

In a typical oil filled pressure sensor assembly, a thin metal isolation diaphragm is welded in front of a pressure sensor chip, which is typically mounted on a header. The gap between the diaphragm and the pressure sensor chip forms a pressure sensor cavity or capsule. The cavity is then filled through a small oil fill tube positioned at the back of the header. The oil fill tube is sealed and the oil is trapped inside the cavity. When pressure is then applied to the thin metal isolation diaphragm, the pressure is transferred from the thin metal isolation diaphragm through the oil contained in the cavity to the pressure sensor chip. This method is typically used to protect the pressure sensor chip from the environment. While this method works well in many applications, in high-pressure applications the pressure transferred through the oil contained in the capsule may also be transferred to oil contained in the oil fill tube, which may leak or burst under higher pressure.

FIG. 1 shows a prior art oil filled pressure sensor assembly 100. In FIG. 1, the assembly 100 is configured to include a header 101, a pressure sensor chip 102, a thin isolation diaphragm 103, an oil fill tube 104, a sealing element 105 and a cavity 107. The isolation diaphragm 103 is welded onto a front of the header 101. The cavity is then filled using the oil fill tube 104 positioned at the back of the header 101. The oil fill tube 104 is then plugged using a sealing element 105 such as a weld to enclose the oil in the cavity 107 and the oil fill tube 104. The oil enclosed in the cavity 107 is used to transfer pressure applied to the thin isolation diaphragm 103 to the pressure sensor chip 102, which measures the transferred pressure. When higher pressure is transferred to the oil in the cavity 107, the oil creates a large stress on the oil fill tube 104 and the sealing element 105. Over time this stress on the oil fill tube 104 and the sealing element 105 may cause the oil to leak out of the oil fill tube 104 causing the cavity 107 to fail by no longer properly transferring pressure applied to the thin isolation diaphragm 103 to the pressure sensor chip 102. Accordingly, there is a need for improved techniques to allow for a fluid-filled pressure sensor assembly capable of higher pressure environments. In addition, other desirable features and characteristics of the present disclosure will become apparent from the subsequent detailed description and claims, taken in conjunction with the accompanying figures and the foregoing technical field and background.

SUMMARY OF THE DISCLOSURE

Briefly described, embodiments of the present invention relate to a fluid-filled pressure sensor assembly capable of higher pressure environments. According to one aspect, a fluid-filled pressure sensor assembly may be adapted for coupling to a structure at a mating surface and may be configured to include a header, a pressure sensor, a diaphragm, a fill hole and a sealing element. The pressure sensor may be coupled to the header. Further, the diaphragm may be coupled to the header so that a fluid region may be disposed between the diaphragm and the pressure sensor. A first pressure applied at the diaphragm may be transferred by a fluid in the fluid region to the pressure sensor for measurement thereof. The fill hole may be coupled to the fluid region. Further, the fill hole may be used to fill the fluid region with the fluid. The sealing element may be coupled to the fill hole. The sealing element may be used to seal the fluid in the fluid region and the fill hole. The diaphragm and sealing element may be configured for positioning forward of the mating surface. During operation of the fluid-filled pressure sensor assembly, the first pressure applied at the diaphragm may be substantially transferred by the fluid in the fluid region and the fill hole to an inner-side of the sealing element and the first pressure may be about equivalent to a second pressure applied at an outer-side of the sealing element.

According to another aspect, a fluid-filled pressure sensor assembly adapted for coupling to a structure at a mating surface by a process may include coupling a pressure sensor to a header. The fluid-filled pressure sensor assembly by the process may include coupling a diaphragm to the header so that a fluid region may be disposed between the diaphragm and the pressure sensor. The fluid-filled pressure sensor assembly by the process may include coupling a fill hole to the fluid region. The fluid-filled pressure sensor assembly by the process may include filling the fluid region with a fluid using the fill hole. The fluid-filled pressure sensor assembly by the process may include sealing the fill hole using a sealing element. The fluid-filled pressure sensor assembly by the process may include the diaphragm and sealing element configured for positioning forward of the mating surface. During operation of the fluid-filled pressure sensor assembly, a first pressure applied at the diaphragm is transferred by the fluid region to provide a second pressure applied at a first side of the sealing element and the second pressure is about equivalent to a third pressure applied at a second side of the sealing element.

BRIEF DESCRIPTION OF THE FIGURES

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

Figure 1:
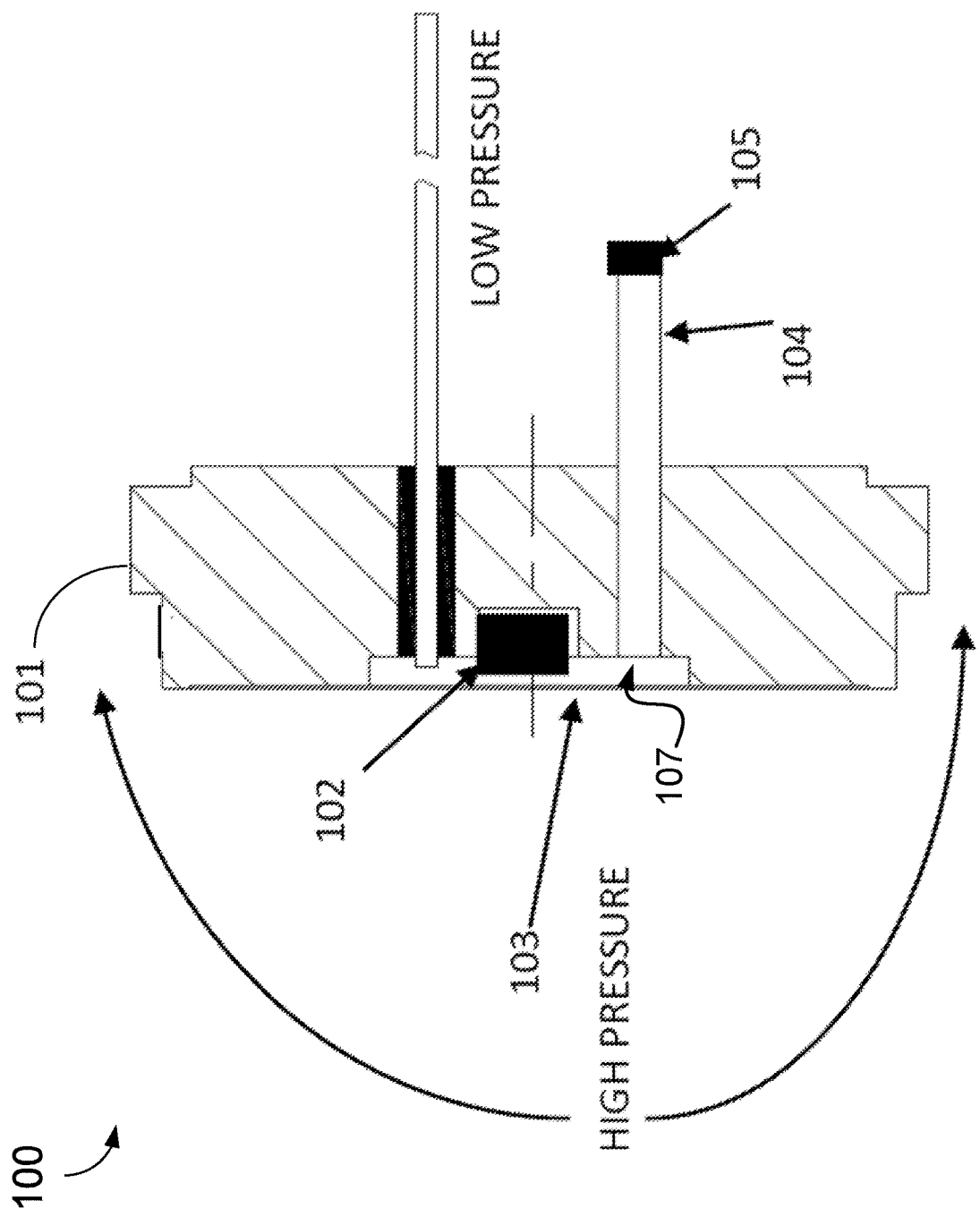
FIG. 1 shows a prior art oil filled pressure sensor assembly.

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The present disclosure provides various examples, embodiments and the like, which may be described herein in terms of functional or logical block elements. Various techniques described herein may be used for a fluid-filled pressure sensor assembly capable of higher pressure environments. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The terms "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive or. Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

In the following description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

This disclosure presents a fluid-filled pressure sensor assembly capable of withstanding higher pressure environments. By configuring a fluid-filled pressure sensor assembly in accordance with various aspects described herein, an improved capability of the fluid-filled pressure sensor assembly is provided. For example, in one embodiment, a fluid-filled pressure assembly may be configured such that a cavity exists between a diaphragm and a sensor. In one embodiment, the assembly may include a fill hole that can be used to fill the cavity with oil or another fluid. Further, a sealing element may be used to seal the fill hole and prevent fluid from leaking out of the cavity. To provide improved capability, the fluid-filled pressure sensor may be configured such that both the diaphragm and a portion of the sealing element are exposed to the pressure media that is intended to be measured. In such a configuration, the diaphragm transfers pressure to the fluid that is ultimately transferred to the portion of the sealing element that is exposed to the fluid. Because the resultant force on the portion of the sealing element that is exposed to the fluid is approximately equivalent to the force on the portion of the sealing element that is exposed to the pressure media, the pressure assembly is able to perform in high-pressure environments.

Figure 2:
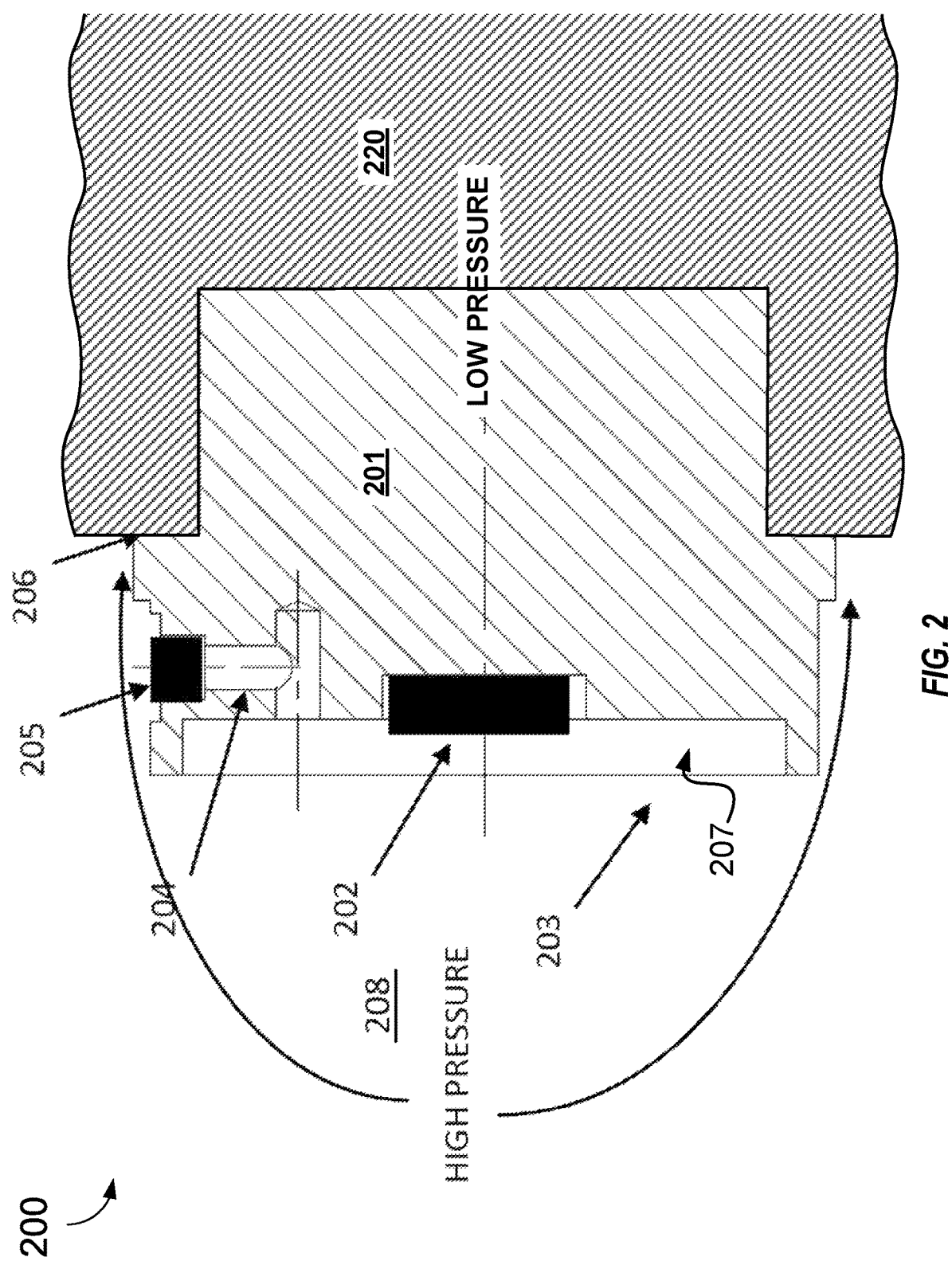
FIG. 2 illustrates one embodiment of a longitudinal cross-section of a fluid-filled pressure sensor assembly in accordance with various aspects set forth herein.

In one example, FIG. 2 illustrates one embodiment of a longitudinal cross-section of a fluid-filled pressure sensor assembly 200 in accordance with various aspects set forth herein. In FIG. 2, the assembly 200 may be configured to include a header 201, a pressure sensor 202, a diaphragm 203, a fill hole 204, a sealing element 205, a flange 206 and a cavity 207. The pressure sensor 202 may be coupled to a front of the header 201, which may be composed of glass, a metal, a ceramic material, or the like. In one example, the header 201 may be composed of a ceramic material. The header 201 may be secured, bonded, epoxied, welded, press fit or the like to the pressure sensor 202. In one example, the pressure sensor 202 may be a piezoresistive sensor. In another example, the pressure sensor 202 may be a piezoresistive sensing network such as a Wheatstone bridge. The diaphragm 203, such as a thin isolation diaphragm, may then be coupled to the front of the header 201, creating the cavity 207 between the diaphragm 203 and the pressure sensor chip 202. The diaphragm 203 may be secured, bonded, epoxied, welded, press fit or the like to the header 201.

In one embodiment, and as shown in FIG. 2, the fill hole 204 may be disposed in and defined by the header 201. After the diaphragm 203 is coupled to the header 201 to form the cavity 207, the cavity 207 may be filled with a liquid, such as an oil, using the fill hole 204. As is shown in FIG. 2, a sealing element 205 may be coupled to an end of the fill hole 204. The sealing element 205 may be secured, bonded, epoxied, welded, press fit or the like to the end of the fill hole 204. Further, the sealing element 205 may be removable to allow for adding or removing a fluid. Likewise, as is shown in FIG. 2, a portion of the sealing element 205 may be exposed to the liquid, such as an oil, filling the cavity 207.

In one embodiment, the flange 206 may be used to couple the header 201 to a housing 220. For example, in one embodiment, the flange 206 may be used to couple the header 201 to a screw housing, an O-ring housing, or other suitable housing. The header 201 may be secured, bonded, welded, threaded, press fit or the like to the housing 220. The housing 220 may be composed of a metal, a ceramic material, or other suitable materials. The housing 220 may be used to couple the assembly 200 to another structure at a mating surface. For example, the housing 220 may be used to couple the assembly 200 to a port of an engine.

Generally, when the assembly 200 is coupled to another structure at a mating surface, a seal forms between the housing 220 and the structure and results in the assembly 200 being sealed into an aperture 208 of the other structure (e.g., the port of an engine), which is associated with some pressure media to be measured. According to one embodiment, the sensor assembly 200 may be configured such that both the diaphragm 203 and the sealing element 205 are sealed in the same aperture 208 of the other structure and, accordingly, are positioned forward of the mating surface. Accordingly, as will be understood and appreciated, the diaphragm 203 and at least a portion of the sealing element 205 will be exposed to the aperture 208 and any pressure within the aperture 208.

For example, as shown in FIG. 2, diaphragm 203 and sealing element 205 are both sealed into the same aperture 208 such that they are exposed to the illustrated high pressure as both would be positioned forward of a mating surface of the other structure. Accordingly, any pressure applied to the diaphragm 203 (e.g., the high pressure in the aperture 208) is likewise applied to the portion of the sealing element 205 that is exposed to the aperture 208. Further, in this configuration, a pressure applied to the diaphragm 203 (e.g., the high pressure in the aperture 208), which is transferred by the fluid in the cavity 207 to the pressure sensor 202, may also be transferred by the fluid in the cavity 207 to the portion of the sealing element 205 that is exposed to the fluid in the cavity 207. As will be understood and appreciated, the pressure transferred by the fluid in the cavity 207 is approximately equivalent to the pressure in the aperture 208. Accordingly, in one embodiment, the force exerted on the pressure sensor 202 and the portion of the sealing element 205 that is exposed to the fluid in the cavity 207 is approximately equivalent to the force exerted on the diaphragm 203 and the portion of the sealing element 205 that is exposed to the pressure in the aperture 208. As will be understood and appreciated, a configuration that positions the diaphragm 203 and a portion of the sealing element 205 forward of the mating surface of the other structure may allow the pressure sensor 202 to operate at higher pressures with a reduced probability of the sealing element 205 or the cavity 207 failing.

FIG. 2 shows the surface of the sealing element 205 exposed to the aperture 208 as being perpendicular to the diaphragm 203. In an example embodiment, however, the surface of the sealing element 205 exposed to the aperture 208 and the diaphragm 203 may be coplanar. For example, the header 201 may be configured such that the sealing element and diaphragm 203 are on the same surface. Accordingly, the fill hole 204 may extend through the surface of the header 201 such that the cavity 207 can be filled with a liquid using the fill hole 204. As with the configuration discussed in relation to FIG. 2, a configuration in which the diaphragm 203 and sealing element 205 are positioned on the surface of the header 201 such that they are coplanar results in approximately equivalent forces being applied to the portion of the sealing element 205 that is exposed to the aperture 208 and the portion of the sealing element 205 that is exposed to the fluid in the cavity 207. One of skill in the art may recognize similar configurations in which the diaphragm 203 and a portion of the sealing element 205 are exposed to the same pressure.

Figure 3:
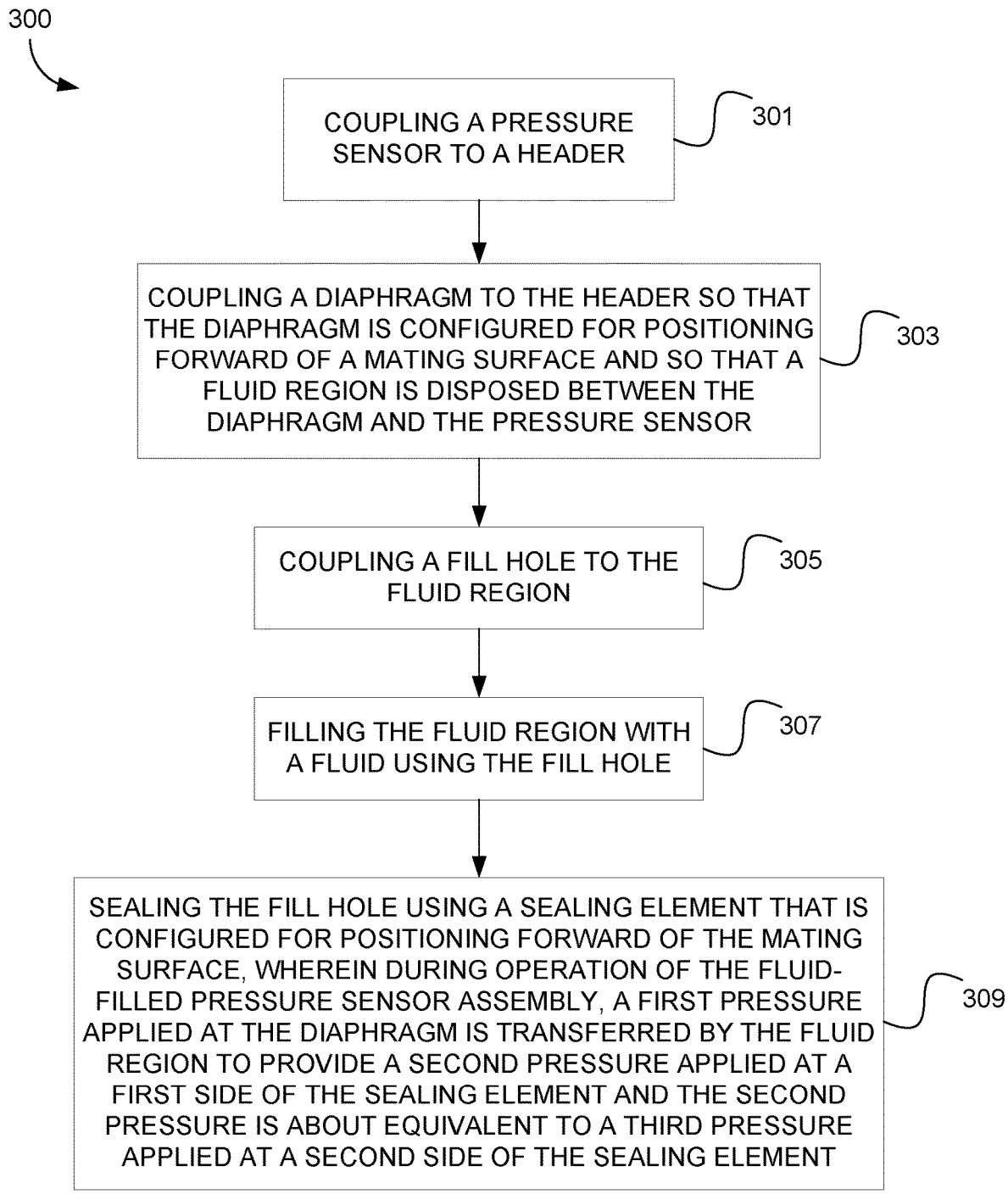
FIG. 3 shows one embodiment of a fluid-filled pressure sensor assembly by a process in accordance with various aspects set forth herein.

FIG. 3 shows one embodiment of a fluid-filled pressure sensor assembly by a process 300 in accordance with various aspects set forth herein. In FIG. 3, the fluid-filled pressure sensor assembly by the process 300 may start, for instance, at block 301, where it may include coupling a pressure sensor to a header. Further, at block 303, the process 300 may include coupling a diaphragm to the header so that the diaphragm is configured for positioning forward of a mating surface and so that a fluid region may be disposed between the diaphragm and the pressure sensor. At block 305, the process 300 may include coupling a fill hole to the fluid region. Also, the process 300 may include filling the fluid region with a fluid using the fill hole, as shown at block 307. At block 309, the process 300 may include sealing the fill hole using a sealing element that is configured for positioning forward of the mating surface. During operation of the fluid-filled pressure sensor assembly, the first pressure applied at the diaphragm may be transferred by the fluid region to provide a second pressure applied at a first side of the sealing element and the second pressure may be about equivalent to a third pressure applied at a second side of the sealing element.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices and systems, described herein are in conjunction with a configuration for the aforementioned single and grouped pressure valve, the skilled artisan will readily recognize that the example methods, devices or systems may be used in other methods, devices or systems and may be configured to correspond to such other example methods, devices or systems as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

What is claimed is:

1. A fluid-filled pressure sensor and engine assembly comprising:
    an engine having a pressure media disposed within an engine port; and
    a fluid-filled pressure sensor coupled to the engine port, the fluid-filled pressure sensor comprising:
        a header having a pressure-media-facing side and a housing-facing side, the pressure-media-facing side configured to face the pressure media disposed within the engine port and comprising a pressure-media-facing surface;
        a housing coupled to the housing-facing side of the header and configured for coupling the fluid-filled pressure sensor to the engine port, the housing including a header-facing surface having:
            a first portion of the header-facing surface in contact with and mated to the header and defining a forward structure of the fluid-filled pressure sensor forward of the housing; and
            a second portion of the header-facing surface (i) extending from, and substantially parallel to, the first portion of the header-facing surface beyond an outer boundary of the header, and (ii) not in contact with and unmated to the header;
        a pressure sensor chip having a substantially flat first side substantially parallel and opposite to a substantially flat second side, a majority of the first side of the pressure sensor chip disposed on and coupled to the pressure-media-facing side of the header;
        a diaphragm coupled to the pressure-media-facing side of the header on the pressure-media-facing surface and positioned forward of the housing so that at least a portion of a first side of the diaphragm is included in the forward structure of the fluid-filled pressure sensor and configured to receive a pressure applied by the pressure media, a fluid region being disposed between and in contact with at least a portion of a second side of the diaphragm and a majority of the second side of the pressure sensor chip;

a fill hole coupled to the fluid region, the fill hole having a first end and a second end, the first end in communication with the fluid region and the second end in communication with an opening in the pressure-media-facing side of the header in the pressure-media-facing surface, the second end being forward of the housing, wherein the fill hole is used to fill the fluid region with a fluid; and a sealing element coupled to the second end of the fill hole, the sealing element for sealing the fluid in the fluid region and the fill hole, at least a portion of a first side of the sealing element disposed on the pressure-media-facing side of the header in the forward structure of the fluid-filled pressure sensor such that the first side of the sealing element is coplanar with the first side of the diaphragm, the sealing element being configured to receive the pressure applied by the pressure media, and the fluid region in communication with a second side of the sealing element, wherein the pressure applied by the pressure media at the first side of the diaphragm is transferred by the fluid in the fluid region to the pressure sensor chip for measurement thereof, and wherein the pressure applied by the pressure media at the first side of the diaphragm is transferred by the fluid in the fluid region to the second side of the sealing element such that the pressure is applied to both the first side and the second side of the sealing element.

2. The fluid-filled pressure sensor and engine assembly of claim 1, wherein the fill hole is disposed in and defined by the header.

3. The fluid-filled pressure sensor and engine assembly of claim 1, wherein the fill hole extends beyond a surface of the header.

4. The fluid-filled pressure sensor and engine assembly of claim 1, wherein the sealing element is a weld.

5. The fluid-filled pressure sensor and engine assembly of claim 1, wherein the sealing element is welded to the fill hole.

6. The fluid-filled pressure sensor and engine assembly of claim 1, wherein the sealing element is epoxied to the fill hole.

7. The fluid-filled pressure sensor and engine assembly of claim 1, wherein the diaphragm is welded to the header.

8. The fluid-filled pressure sensor and engine assembly of claim 1, wherein the housing is a screw housing or an O-ring housing.

9. A fluid-filled pressure sensor and engine assembly made by a process comprising:

coupling a pressure sensor chip to a header, the header having a pressure-media-facing side and a housing-facing side, the pressure-media-facing side configured to face a pressure media having a pressure and being disposed within an engine port of the engine, the pressure-media-facing side comprising a pressure-media-facing surface, the pressure sensor chip having a substantially flat first side substantially parallel to and opposite a substantially flat second side, a majority of the first side of the pressure sensor chip being disposed on and secured to the pressure-media-facing side of the header;

coupling a housing to the housing-facing side of the header, the housing configured for coupling the fluid-filled pressure sensor to the engine port, the housing including a header-facing surface having:
a first portion of the header-facing surface in contact with and mated to the header and defining a forward structure of the fluid-filled pressure sensor forward of the housing; and
a second portion of the header-facing surface (i) extending from, and substantially parallel to, the first portion of the header-facing surface beyond an outer boundary of the header, and (ii) not in contact with and unmated to the header;

coupling a diaphragm to the pressure-media-facing side of the header on the pressure-media-facing surface, the diaphragm being positioned forward of the housing so that at least a portion of a first side of the diaphragm is included in the forward structure and configured to receive the pressure applied by the pressure media, a fluid region being disposed between and in contact with at least a portion of a second side of the diaphragm and a majority of the second side of the pressure sensor chip;

coupling a fill hole to the fluid region, the fill hole having a first end and a second end, the first end in communication with the fluid region and the second end in communication with an opening in the pressure-media-facing side of the header in the pressure-media-facing surface, the second end being forward of the housing;

filling the fluid region, via the fill hole, with a fluid;

sealing the fill hole using a sealing element that is coupled to the second end of the fill hole and positioned forward of the housing such that a first side of the sealing element is disposed on the pressure-media-facing side of the header on the forward structure such that the first side of the sealing element is coplanar with the first side of the diaphragm, the sealing element being configured to receive the pressure applied by the pressure media; and coupling the housing to the engine port of the engine, wherein the pressure applied by the pressure media at the first side of the diaphragm is transferred by the fluid in the fluid region to the second side of the sealing element such that the pressure is applied to both the first side and the second side of the sealing element.

10. The fluid-filled pressure sensor and engine assembly made by the process of claim 9, wherein the fill hole is disposed in and defined by the header.

11. The fluid-filled pressure sensor and engine assembly made by the process of claim 9, wherein the fill hole extends beyond a surface of the header.

12. The fluid-filled pressure sensor and engine assembly made by the process of claim 9, wherein the sealing element is a weld.

13. The fluid-filled pressure sensor and engine assembly made by the process of claim 9, wherein the sealing element is welded to the fill hole.

14. The fluid-filled pressure sensor and engine assembly made by the process of claim 9, wherein the sealing element is epoxied to the fill hole.

15. The fluid-filled pressure sensor and engine assembly made by the process of claim 9, wherein the diaphragm is welded to the header.

16. The fluid-filled pressure sensor and engine assembly made by the process of claim 9, wherein the housing is a screw housing or an O-ring housing.

* * * * *